United States Patent
Silverman et al.

(10) Patent No.: US 10,063,894 B2
(45) Date of Patent: Aug. 28, 2018

(54) SYSTEMS AND METHODS FOR DIFFERENTIAL MEDIA DISTRIBUTION

(71) Applicant: Disney Enterprises, Inc., Burbank, CA (US)

(72) Inventors: Leon Silverman, Encino, CA (US); Anne Chang, Sunland, CA (US); Kari Grubin, Burbank, CA (US); Jeffrey Miller, Burbank, CA (US); Christopher Witham, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/479,057

(22) Filed: Apr. 4, 2017

(65) Prior Publication Data

US 2018/0199081 A1 Jul. 12, 2018

Related U.S. Application Data

(60) Provisional application No. 62/444,761, filed on Jan. 10, 2017.

(51) Int. Cl.
| *H04N 21/2343* | (2011.01) |
| *H04N 21/235* | (2011.01) |
| *H04N 21/234* | (2011.01) |
| *G06F 17/30* | (2006.01) |
| *H04N 21/436* | (2011.01) |
| *H04N 21/84* | (2011.01) |

(52) U.S. Cl.
CPC . *H04N 21/23439* (2013.01); *G06F 17/30038* (2013.01); *H04N 21/234* (2013.01); *H04N 21/2353* (2013.01); *H04N 21/234372* (2013.01); *H04N 21/43615* (2013.01); *H04N 21/84* (2013.01)

(58) Field of Classification Search
CPC .......... H04N 21/23439; H04N 21/234; H04N 21/234372; H04N 21/2353; H04N 21/43615; H04N 21/84; G06F 17/30038
See application file for complete search history.

(56) References Cited

U.S. PATENT DOCUMENTS

| 6,104,831 A * | 8/2000 | Ruland .............. G06K 9/00771 348/152 |
| 2011/0154426 A1* | 6/2011 | Doser .................. H04N 1/6088 725/118 |
| 2015/0007239 A1* | 1/2015 | Cranman ........... H04N 21/2402 725/95 |

* cited by examiner

*Primary Examiner* — Oleg Asanbayev
(74) *Attorney, Agent, or Firm* — Sheppard Mullin Richter & Hampton LLP

(57) ABSTRACT

Systems for electronic media distribution includes a differential versioning server configured to receive a first media file including a first set of data with a first set of attributes and a second media file including a second set of data with a second set of attributes, generate a first differential data file as a function of differences between the first media file and the second media file, and generate a first differential metadata file including an encoding data set configured to enable a media decoder to regenerate the second media file by applying the first differential data file to the first media file. Systems for electronic media distribution may also include a receiver communicatively coupled to a differential versioning decoder configured to receive the first media file and the first differential data file and generate the second media file by applying the first differential data file to the first media file.

8 Claims, 11 Drawing Sheets

SYSTEMS AND METHODS FOR DIFFERENTIAL MEDIA DISTRIBUTION

CROSS-REFERENCE TO RELATED APPLICATIONS

This application claims priority to U.S. Provisional Application No. 62/444,761, filed on Jan. 10, 2017, the contents of which are incorporated herein by reference.

TECHNICAL FIELD

The disclosed technology relates generally to media content distribution, and more particularly, some embodiments relate to systems and methods for differential media content distribution.

BACKGROUND

Digital media distribution has been impacted by the increase in image and sound formats. This increase has impacted the size and number of digital media packages used to distribute media to end users in the multitude of desired formats. It is expected that image and sound formats will continue to diversify as new formats are created. Accommodating delivery for new projection and display technologies that deliver increased resolution, brightness, color gamut, and contrast in addition to new, multiple sound formats alongside the existing multiple delivery specifications necessary to serve digital cinema and subsequent digital distribution present significant logistical fulfillment challenges.

To accommodate the diversity of playback devices available to consumers, media creators and distributors generally create, store, and maintain individual and distinct media file versions of a particular production or content file. For example, for any given television show or movie production, individual media version files may need to be maintained for standard definition, high definition, ultra-high definition, 16:9 pixel ratio, 4:3 pixel ratio, varying language formats, varying content formats and censorship formats, varying color formats, varying sound formats, and any other media file attributes as known in the art, as well as any possible permutation of these different attribute types. Accordingly, the number of media version files that must be maintained becomes increasingly voluminous as image, sound, and content diversity increases.

BRIEF SUMMARY OF EMBODIMENTS

According to various embodiments of the disclosed technology, systems and methods for differential media content distribution are described. Embodiments disclosed herein may include a system for electronic media distribution including a differential versioning server. The differential versioning server may include a processor and a non-transitory computer readable medium with computer readable instructions embedded thereon, wherein the computer readable instructions, when executed, cause the processor to receive a first media file and a second media file. The first media file may include a first set of data with a first set of attributes selected from one or more attribute classes, and the second media file may include a second set of data with a second set of attributes selected from the one or more attribute classes. For example, attribute classes may include number of bits, bit-depth, color format, audio format, localization format, content format, or other attribute classes as known in the art. The computer readable instructions may further cause the processor to generate a first differential data file as a function of differences between the first media file and the second media file and generate a first differential metadata. The first differential data file may include an encoding data set configured to enable a media decoder to regenerate the second media file by applying the first differential data file to the first media file. In some examples, the first set of attributes is a subset of the second set of attributes.

In some embodiments, the function of differences between the first media file and second medial file includes comparing the first media file with the second media file at a bit-by-bit granularity, a pixel-by-pixel granularity, or a frame-by-frame granularity. Example systems may include a communications network and a media repository, wherein the differential versioning server and the media repository are located on the communications network, and the first media file and the first differential data file are stored in the media repository. In some examples, a user device and a local gateway are configured to establish a communications channel between the user device and the communications network, wherein the user device is configured to access the first media file, the second media file, the first differential data file, or the first differential media file through the communications channel.

In some embodiments of the system, a playback device may be communicatively coupled to the differential versioning decoder. The playback device may be configured to playback the second media file. For example, the playback device may be a television, a mobile phone, a tablet computer, a personal computer, a video game console, a projector, or other media playback devices as known in the art.

Some embodiments of the system may include a receiver communicatively coupled to a differential versioning decoder. The differential versioning decoder may include a processor and a non-transitory computer readable medium with computer readable instructions embedded thereon, wherein the computer readable instructions, when executed, cause the processor to receive the first media file and the first differential data file and generate the second media file by applying the first differential data file to the first media file.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments disclosed herein are directed to systems and methods for distributing multi-versioned digital media files. More specifically, some embodiments disclosed herein disclose systems and methods for generating differential data files by comparing various versions of digital media files with one or more master versions of a digital media file. Some embodiments of the disclosure further provide a system and method for receiving a master version of the digital media file and the differential data file corresponding to a digital media file version with desired attributes, and recreating the desired digital media file version for playback. Accordingly, embodiments disclosed herein provide efficient and cost effective mechanisms for storing, maintaining, and distributing multi-versioned digital media files by generating differential data files and only storing one or more master digital media files along with the differential data files, as opposed to storing each complete digital media file version individually.

Figure 1A:
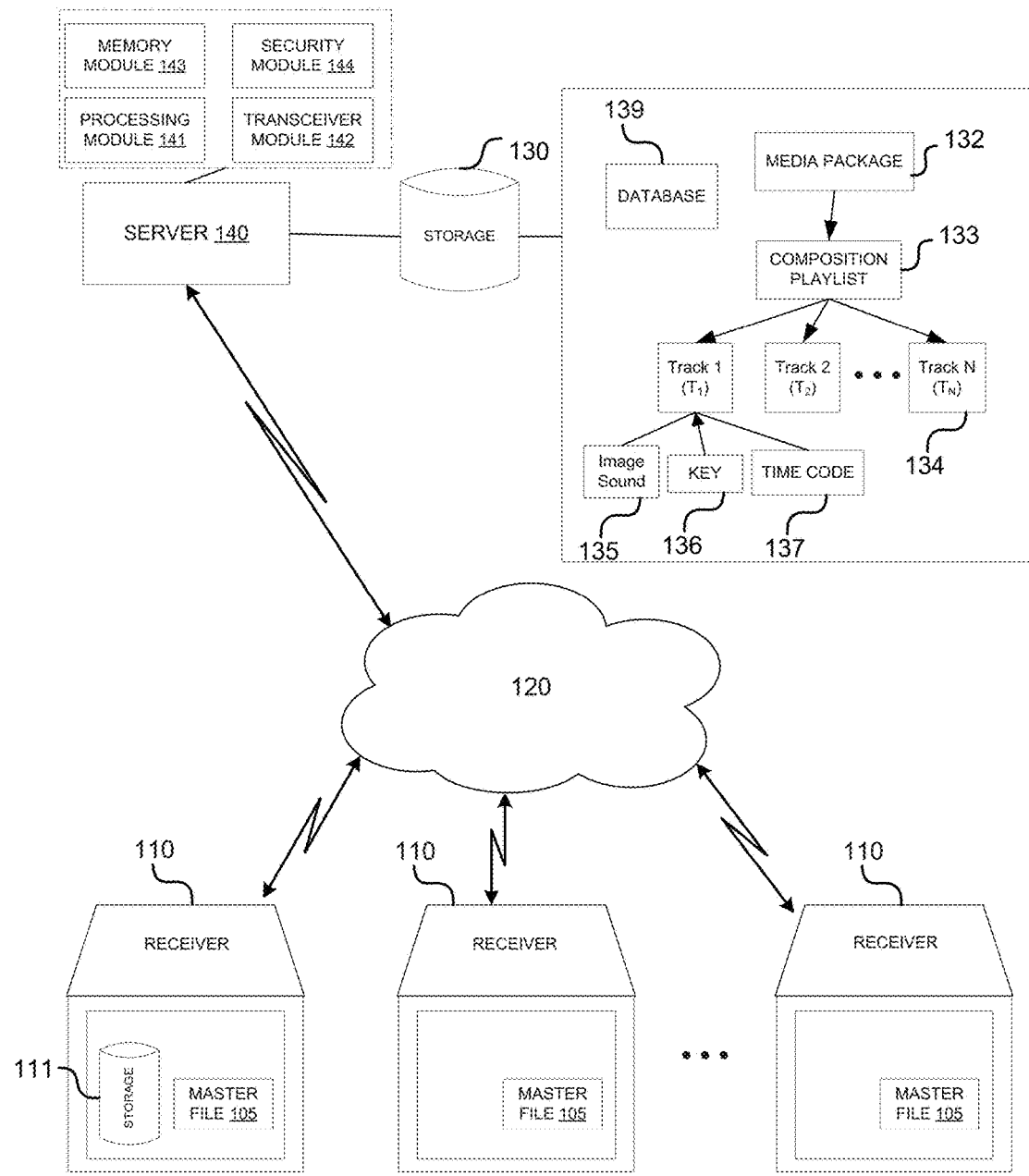
FIG. 1A is an example system for automatically distributing digital media files.

FIG. 1A illustrates an example system for distributing digital media files. In distribution system 100, a server 140 may distribute digital media track files 134 stored in storage 130 to a plurality of receivers 110 over communication network 120. Digital media files may be automatically pushed from server 140 to receivers 110. In addition to or instead of pushing digital media files, digital media files may be pulled by receivers 110 from server 140 in response to requests from receivers 110.

Communication network 120 may include a cloud-based network, a satellite network, a cellular telephone network, an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), or any combination thereof. Communication network 120 may use a number of communication mediums. The communication medium may be a wireless network system such as a satellite network, a cellular network, a wireless personal area network, a wireless local area network, or other similar communication medium. The communication medium may alternatively be a wired system, such as a coaxial cable system, a fiber optic cable system, an Ethernet cable system, or other similar communication medium. The communication medium may be a combination of wireless and wired systems. In some examples, the communication medium may include the transfer of data using a physical removable data storage device, such as a hard drive, thumb drive, or other writable physical data storage device.

Server 140 may be operated by a digital media file distributor or digital content creator (for example, a movie studio). Server 140 may comprise a single computer unit or a distributed computer system that includes a combination of computer readable instructions and hardware to perform the cinema file distribution functions of distribution system 100. For example, server 140 may include a processing module 141, a transceiver module 142 for communicating over network 120, a memory module 143, a security module 144, storage 130, and a database 139. These modules and components may be separated or integrated. These modules may be disposed within server 140 or communicatively attached to server 140.

With reference now to storage 130, digital media files 132 may be packaged on server 140. In some examples, digital media files may be packages for movie cinemas in compliance with Digital Cinema Initiative (DCI) standards, for example, as one or more Digital Cinema Package (DCP) files. Each DCP file may be a collection of all files necessary for one digital cinema work such as a motion picture and its trailers. In other examples, digital media files may be packaged for Internet streaming applications, television, or other media distribution channels as known in the art.

In one implementation, digital media files 132 may be assembled on demand for server 140 by storing all of digital media files 132 in storage 130. In another implementation, the digital media file 132 may be stored within regional depots. The assembled digital media file may be customized to a theater chain, territory or individual screen or receiver.

The assembled digital media files 132 may be pushed by server 140 or pulled by an authorized receiver 110. During delivery of the digital media files 132, a computer readable instructions based transfer manager (not pictured) may validate that the digital media files 132 contains appropriately named files, keys, and all other information. The transfer manager may also track delivery of the digital media files 132. For example, it may monitor that the digital media file 132 arrives at its destination without checksum errors, report progress during digital media file 132 transit, and report if a digital media file 132 was created but not sent.

In yet another implementation, the system may be configured to provide an update on the status, configuration, and state of all digital media file 132 orders, requests for supplemental material, and generated keys.

A single digital media file 132 may have multiple composition playlists (CPLs) 133. For example, a digital media file 132 may have three CPLs having a common set of track files 134 but separate dubbed set of sound track files for a movie in three languages (e.g., Chinese, German, and Spanish). Each CPL 133 may be a textual list containing instructions on how the elements of a digital media file, i.e., track files 134, are played back. A CPL 133 may have a time code index that specifies the order in which associated track files are played to present a digital cinema work such as a motion picture.

Track files 134 may be digital media files that are discretely distributed in accordance with system 100. Each track file may include metadata or essence 135 within a file body, and an associated file header and file footer. A track file may also have a time code 137 to allow for synchronization with associated track files.

A track file 134 may include image metadata 135, sound metadata 135, subtitle (timed text and/or subpicture) metadata or caption metadata. A track file 134 may comprise metadata containing, for example, French subtitles for the first ten minutes of a movie, an advertisement segment, a director's cut of a movie, a movie's alternate ending, a segment of a movie (e.g., first 5 minutes, different rated version scene, credits, etc. . . . ), or the dubs for a movie segment. Each track file 134 has an associated time code 137 for synchronizing its playback with other related (i.e., part of the same cinema work) track files 134. The CPL 133 uses a time code index to play associated track files (e.g., sequential image track files or synchronized image and sound track files) 134 in the correct order.

During the digital media file 132 creation process, each track file 134 may be encrypted and assigned a unique encryption key 136. Each key 136 may be stored in storage 130. During the delivery process (push or pull), each encryption key associated with a track file may be delivered to allow for decryption on the receiving end. Key delivery messages (KDMs) may be used to wrap the encryption key in a file format (e.g., XML) that only allows specific trusted devices access to the key.

With reference now to the receiver side of the file distribution system, each receiver 110 may receive an initial master file 105 from a content distributor for a particular work (e.g., movie, television show, video, etc.), comprising a CPL 133 and associated track files 134. Master file 105 may be associated with the work's initial release (e.g., the Initial English theatrical version). Subsequent deliveries of an updated CPL with updated track files customized for a specific region or theater (e.g., subtitles or audio (dubs) track files for foreign theaters, image track files that add additional scenes) may then supplement the initial delivery. In this way, redelivery of the entire digital cinema file content (i.e., all track files) associated with a cinema work is not required during incremental updates such as advertisements, additional scenes, alternate endings, etc.

Receivers 110 may have a storage 111 for storing CPLs and associated track files for each work received by the receiver. Storage 111 may have a disk array, hard drive, server or other means for storing and organizing digital cinema content. Related track files 134 may be stored in the same folder or general location within storage 111.

Server 140 may include a database 139 in storage 130 to manage the delivery of CPL and track file updates to receivers 110 within the file distribution system 100. Database 139 may store the following data for each receiver 110: the receiver's region or location, the theater's language, the theater's time zone, the theater's current CPL, associated track files (and encryption keys) for works that the theater is currently playing or has played in the past, the receiver's history of CPL and track file updates, the receiver's status, etc. Additionally, database 139 may include a set of all existing CPLs and associated track files. Each time that CPL and track file updates are pushed or pulled from server 140 by a receiver 110, server 140 may refer to the applicable database entry. Database 139 may be configured to automatically update the stored data associated with a receiver 110 each time that server 140 transmits an updated CPL and updated track files to a theater 110. In another implementation, a database entry for a receiver may be manually updated via user input (e.g., keyboard and mouse).

Figure 1B:
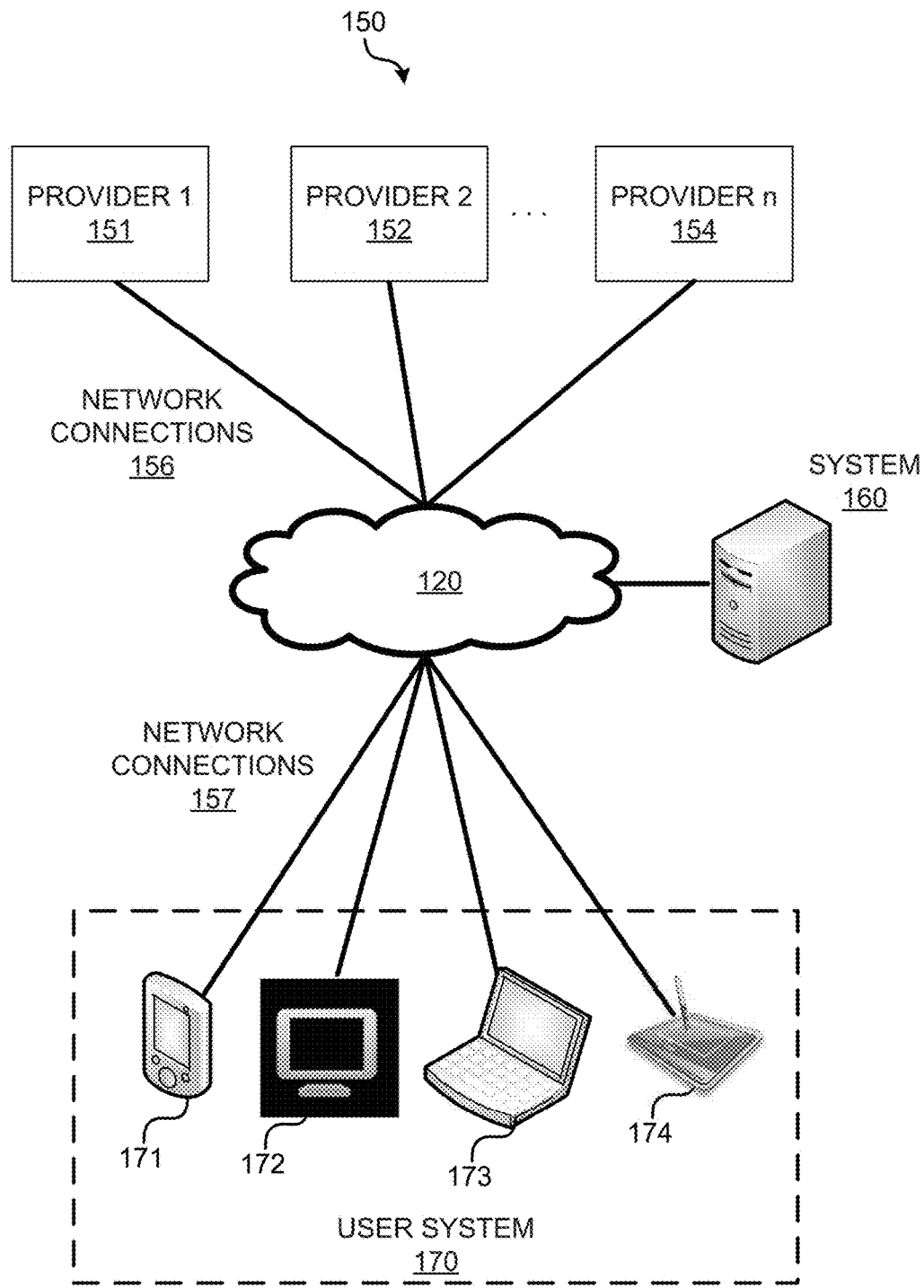
FIG. 1B is an example environment for implementation of multiple embodiments disclosed herein.

FIG. 1B illustrates an example environment 150 where various embodiments may be implemented. The environment 150 may include various user devices 171-174, which may be collectively referred to as a user system 170 connected via a communication network 120. User devices 170 may include receivers configured to receive digital media files, and playback devices (i.e., movie projectors, television displays, computer monitors, etc.) A digital media file may include one or more media content (e.g., video, audio, text, etc.). When there are multiple media contents, these multiple media contents may be multiplexed. The media content may be compressed, encoded by various codecs, and/or encrypted.

As shown, a user system 170 may also include a smartphone 171 (e.g., iPhone®), a TV 172, a computer 173 (e.g., a personal computer), and/or a tablet 174 (e.g., iPad®), through their respective network connections 157, can either interact directly or indirectly with the various digital content providers 151-154, via their respective network connections 156. For example, a network connections 156 and 157 may include wired connections (e.g., Digital Subscriber Line (DSL), optical) and/or wireless connections (e.g., Wi-Fi.) In various embodiments, network connections 156 or 157 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. Network connections 156 or 157 may be the same or different throughout the environment 150. Various user devices 170 described herein may be implemented using the example computer system illustrated in FIG. 5.

In one embodiment, a media file archive platform may be hosted by a media file archive system 160 which is coupled to the communication network 120. The media file archive system 160 may manage archiving and/or playback of various media files among various providers 151-154, and among various devices 171-174 of a user system 170. For example, the media file archive system may archive different media files. The media files may belong to a family, where each media file provides a different version of a digital media (e.g., a movie, a game, etc.). Media files of the same family may be based on one base media file, from which derivative media files are created. The media file archive system may archive media files such that some of the media files are not archived entirely. In various embodiments, the base media file and the difference between a media file and the base media file are stored. Accordingly, storage size is reduced significantly, and the integrity of different media files is realized. The media file archive system may facilitate the playback of various media files.

In various embodiments, the user system 170 may display an interface related to archive and/or play back of various media files. For example, the user system may be configured to upload one or more media files, to retrieve one or more media files including a base media file, to provide information of archived media files (e.g., by a record such as a log file, or a look-up table), to receive a media file archive request from a user, and/or to receive a media file play request from a user. In one embodiment, a user may download a client component of a media file archive system such as a media file archive application. The client component may be executed locally at a user system. In some embodiments, the media file archive system may provide back-end support for the client component.

The media content archive system 160 may be responsible for receiving one or more media files, identifying the base media file of one family, analyzing various media files, identifying the difference between a media file to be archived and a base media file, storing the base media file, creating and storing a media file consisting of the difference between the media file to be archived and a base media file, providing information on how various media files are archived, and/or facilitating playback of a media file on one or more user devices of the user system.

Figure 2A:
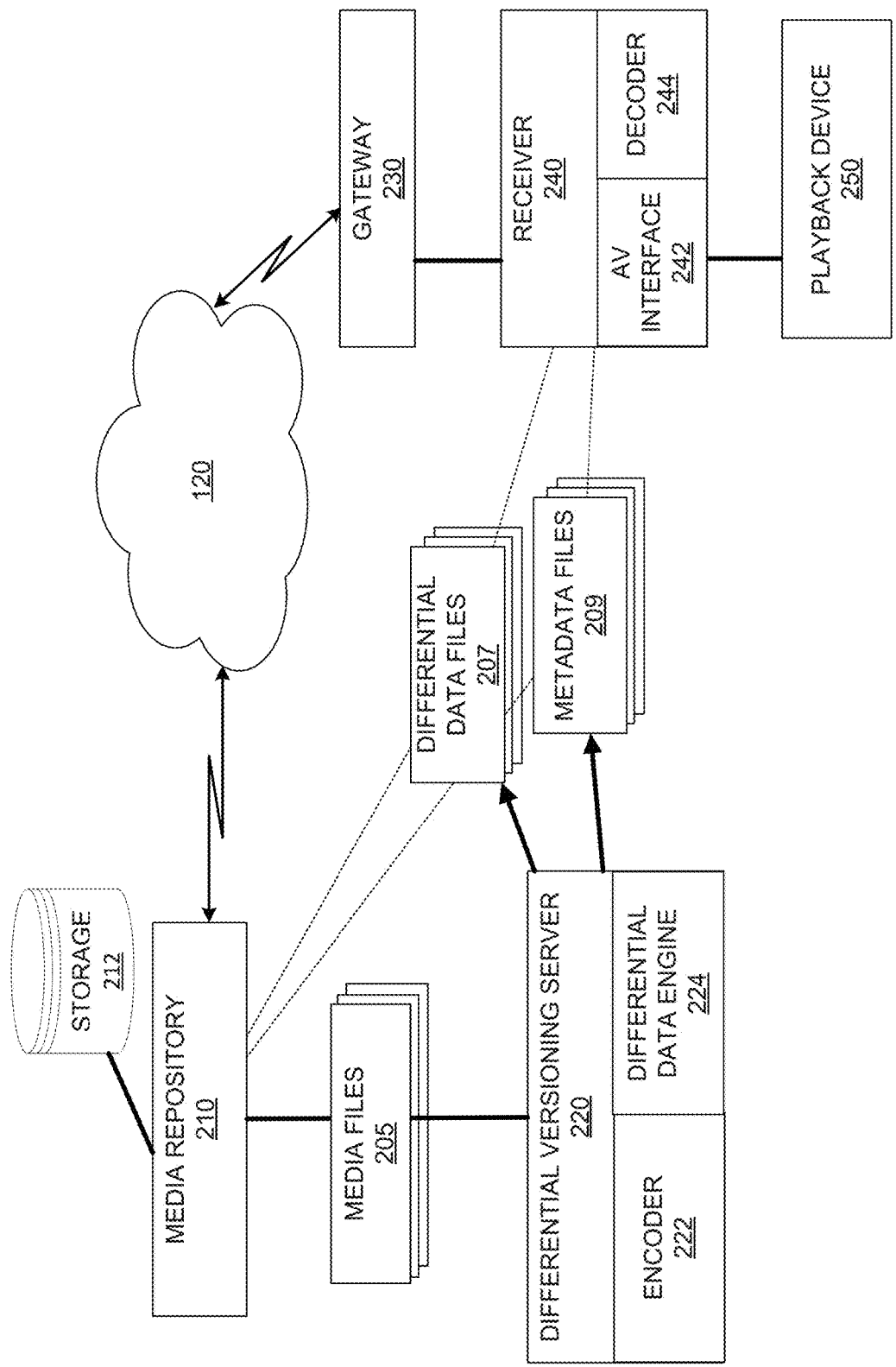
FIG. 2A illustrates an example system for differential versioning of digital media tiles, consistent with embodiments herein.

FIG. 2A illustrates an example system for differential versioning of digital media files. Referring to FIG. 2A, a system for differential versioning of digital media files may include a media repository 210 communicatively coupled to storage 212. For example, media repository 210 may be directly attached or network-attached to storage 212. In some examples, storage 212 may be internal to media repository 210, or storage 212 may be cloud-based storage. Media repository 210 may store digital media files 205 on storage 212. Digital media files 205 may include media content data sets in the form of movies, television shows, music, videos, or other digital media content as known in the art.

Digital media files 205 may also include multiple versions of each particular media content data set, wherein each version has a unique set of attributes selected from one or more attribute classes. For example, attribute classes may include number of bits, bit-depth, color format, audio format, localization format, content format, or other attribute classes as known in the art. Number of bits may describe a resolution, e.g., as standard definition, high definition, or ultra-high definition, each including progressively more total bits, respectively. Bit-depth describes the amount of information stored in each pixel, e.g., to convey information such as color, brightness, backlighting, 2-dimension vs. 3-dimension data/stereo vision data, or other instructions to a playback device to control the desired appearance of a particular pixel when displayed on a display. Audio format may include numbers of channels available to convey sound information to a playback device, e.g., mono, stereo, surround sound, etc. Localization format may define characteristics of the media content data set that may be tailored for particular localities, such as language, display format (4:3 or 16:9), encoding format, or other characteristics that may vary between different localities as known in the art. Content format may define a censorship format (e.g., a rated R version, rated PG version, etc.), or other content variations such as a director's cut, editor's cut, made-for-TV version, alternate endings, etc. In some examples, a media content data set may include multiple versions in a single digital media file, or may include additional content, e.g., to additional scenes or content from two or more content variations.

Still referring to FIG. 2A, the system may also include a differential versioning server 220 communicatively coupled to media repository 210. For example, differential versioning server 220 may be directly attached, network-attached, or otherwise in communication with media repository 210. Differential versioning server 220 may include encoder 222 and differential data engine 224, each of which may be implemented using one or more computer components as described herein with reference to FIG. 5. For example, differential data engine 224 may include a processor and a non-transitory computer readable medium with computer readable instructions embedded thereon, the computer readable instructions being configured to receive a first digital media file and a second digital media file, and generate a differential data file 207 which identifies the differences between the first and second digital media files.

Differential data engine 224 may generate the differential data at a bit level, a pixel level, a frame level, or other granularities as would be known in the art. For example, the first and second digital media files may be produced from related media content data sets (i.e., they may be different versions of the same movie or television show). The first digital media file may have a first set of attributes selected from a first group of attribute classes, and the second digital media file may have a second set of attributes selected from a second set of attribute classes. For example, the first digital media file may be an ultra-high definition, 32-bit color, 5:1 sound, R-rated version of a movie, whereas the second digital media file may be a standard definition, 8-bit color, stereo, PG-rated version of the same movie. As such, as between the two digital media files, the first digital media file includes a more complete data set across each attribute class. The differential data engine 224 receives both files, compares them at a particular granularity (e.g., frame level, pixel level, bit level, etc.) and generates a difference map (e.g., a frame map, pixel map, or bit map of the differences). Encoder 222 may then use the difference map to generate a differential data file 207.

In some examples, encoder 222 may also generate a corresponding metadata file 209 which includes information to decode the differential data file when compared with one of the digital media files. For example, the metadata file 209 may include instructions for comparing the first digital media file with the differential data file to generate the second digital media file (i.e., by applying the difference map to the first digital media file). In other examples, the metadata file 209 may include instructions for comparing the second digital media file with the differential data file to generate the first digital media file. The metadata file may also include information about the attribute classes and specific attributes available in each media file, checksum or other error correction information, encryption, access control, licensing, or other information that would ordinarily be stored in a metadata file, as known in the art.

By using the system described above, a single base digital media file may be stored in storage 210, along with a plurality of differential data files 207, each corresponding to a different set of attributes, and corresponding metadata files 209. Accordingly, the system described herein enables the media repository to retain content corresponding to a large number of media versions, each with different attributes, while only storing a single base digital media file, or a limited subset of base digital media files, for each media content data set.

Still referring to FIG. 2A, the system may include receiver 240. Receiver 240 may be located at a residence, business, movie theater, mobile device, or other location where digital media content may be received. Receiver 240 may access either or both of media repository 210 and differential versioning server 220 through communication network 120. In some embodiments, receiver 240 accesses communication network 120 through gateway 230. Gateway 230 may be a router, modem, VPN/firewall device, wireless communication device, or other gateway device as known in the art. Receiver 240 may include a decoder 244 and an AV interface 242 for interfacing with a playback device 250. For example, playback device 250 may be a projector, television, desktop computer, laptop computer, tablet computer, mobile phone, radio, or other playback device as known in the art.

Figure 5:
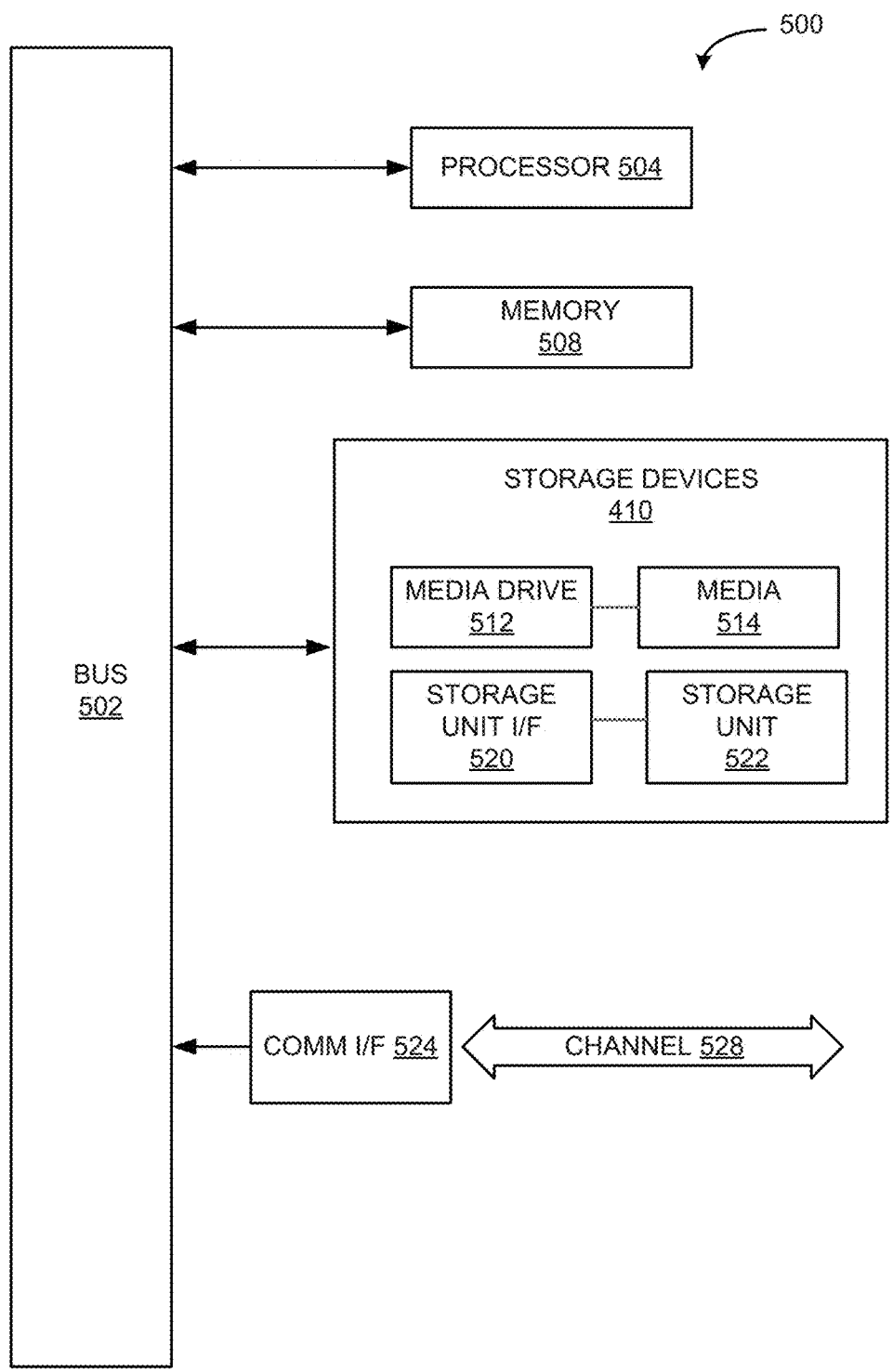
FIG. 5 illustrates an example computing component that may be used in implementing various features of embodiments of the disclosed technology.

Decoder 244 may be implemented using computer components described herein with reference to FIG. 5. For example, decoder 244 may include a processor and a non-transitory computer readable medium with computer readable instructions embedded thereon. The computer readable instructions may cause the processor to receive differential data files 207 and digital media files 205. The computer readable instructions may further cause the processor to generate a playback-ready digital media file with desired attributes by comparing one or more differential data files with a base digital media file. In some examples, the computer readable instructions may also cause the processor to receive metadata files 209 and uses the instructions in one or more metadata files to generate a playback-ready digital media file from a base digital media file and one or more differential data files.

For example, each differential data file may include a difference map that may be applied to the base digital media file to derive a playback-ready digital media file with desired attributes. Instructions for decoding the playback-ready digital media file from the base digital media file and the differential data file may be included in a corresponding metadata file.

This process implemented by decoder 244 may be repeated to create multiple playback-ready digital media files with varying attributes using a single base digital media file. For example, decoder 244 may apply a first differential data file to a first digital media file to generate a second digital media file with one set of attributes, and then a second differential data file may either be applied to the first digital media file, or in some examples, to the generated second digital media file, to generate a third digital media file with another set of attributes. In this way, a user controlling receiver 240 may select a desired set of attributes from a list of possible available attribute, or the playback device 250 may identify an applicable set of attributes to receive 240 based on playback device capabilities, and decoder 244 may respond by selecting one or more differential data file 207 to apply to the base digital media file to generate a playback ready digital media file with desired attributes. The playback ready digital media file may then be sent by AV interface 242 to playback device 250.

Figure 2B:
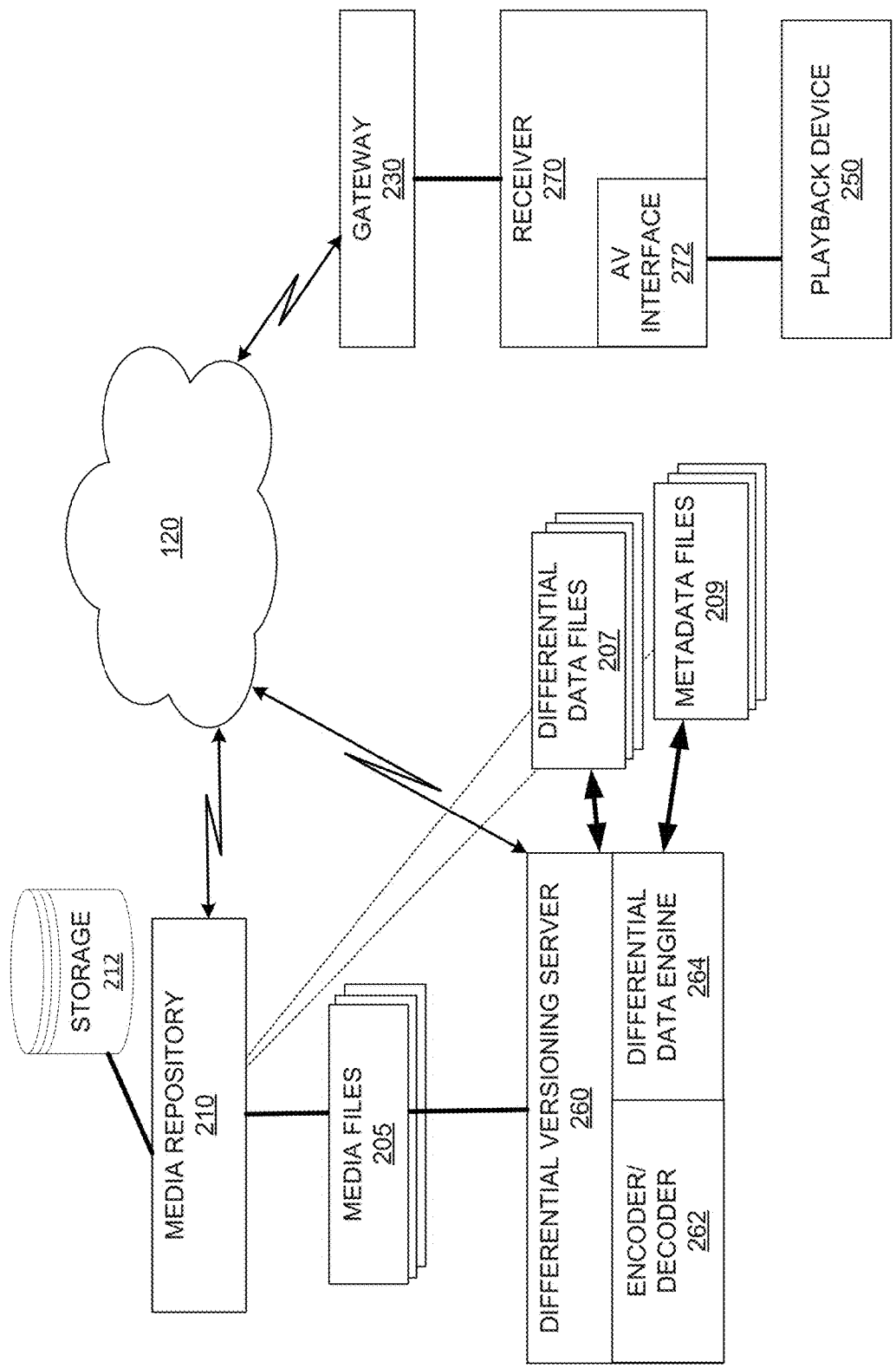
FIG. 2B illustrates an example system for differential versioning of digital media files, consistent with embodiments herein.

FIG. 2B also illustrates an embodiment of a system for differential versioning of digital media files. As illustrated by FIG. 2B, some example systems may include receiver 270. Receiver 270 may include an AV interface 272, but no differential data decoder (as illustrated in FIG. 2A). Instead, receiver 270 may be configured (still with a standard AV decoder) to receive digital media files from either media repository 210 or differential versioning server 260. Receiver 270 may be a standard AV receiver as known in the art. The digital media file received by receiver 270 may be a base digital media file that includes multiple media content data sets and versions, and the receiver 270 may only be capable of reading one of the data sets corresponding to attributes that the receiver is capable of decoding (e.g., if a standard definition receiver, then only the standard definition data set would be decoded and sent to playback device 250).

In some examples, differential versioning server 260 includes encoder/decoder module 262. Receiver 270 may request a digital media file from media repository 210 that includes a different set of attributes than the base digital media file. In this example, the request would be sent to differential versioning server 260, and encoder/decoder module 262 would then receive the base digital media file and one or more differential data files and metadata files corresponding to the requested set of attributes. Encoder/decoder module 262 would then apply the one or more differential data files to the base digital media files to generate the desired digital media file with desired attributes, which may then be encoded using standard AV encoding processes as known in the art and transmitted to receiver 270, where the desired digital media file is decoded and sent by AV interface 272 to playback device 250. In some examples, the differential decoder may be a separate device communicatively coupled to either differential versioning server 260, receiver 270, or both, for example, via local area network or on the cloud.

Figure 3A:
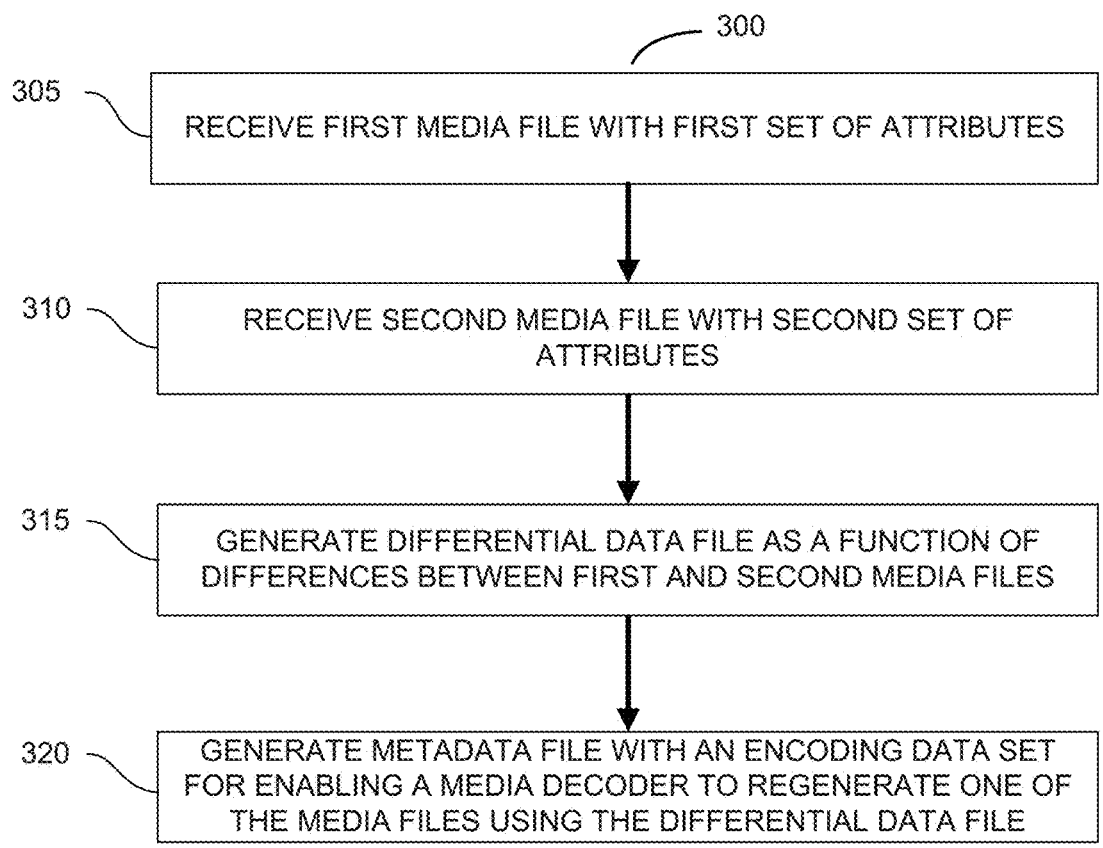
FIG. 3A illustrates an example method for encoding differential versioned digital media files, consistent with embodiments herein.

FIG. 3A illustrates an example method for encoding differential versioned digital media files. As illustrated, the example method 300 may include receiving a first digital media file with a first set of attributes at step 305, receiving a second digital media file with a second set of attributes at step 310, and generating a differential data file as a function of the differences between the first and second digital media files at step 315. For example, method 300 may be performed by a differential versioning server, as disclosed herein. The differences between the first and second digital media files may be calculated at varying degrees of granularity, including at a bit level, a pixel level, a frame level, or other degrees of granularity as known in the art. In some embodiments, method 300 also includes generating a metadata file with an encoding data set for enabling a media decoder to regenerate one of the digital media files using the differential data file at step 320.

It will be appreciated that method 300 may be repeated multiple time to generate multiple differential data files, each representing a difference calculation between a first, or base digital media file, and another digital media file with different attributes. Differential data files may also be calculated in intermittent steps, such that a first differential data file is generated between a first digital media file and a second digital media file, and a second differential data file is generated from the second digital media file and a third digital media file, and so on.

Figure 3B:
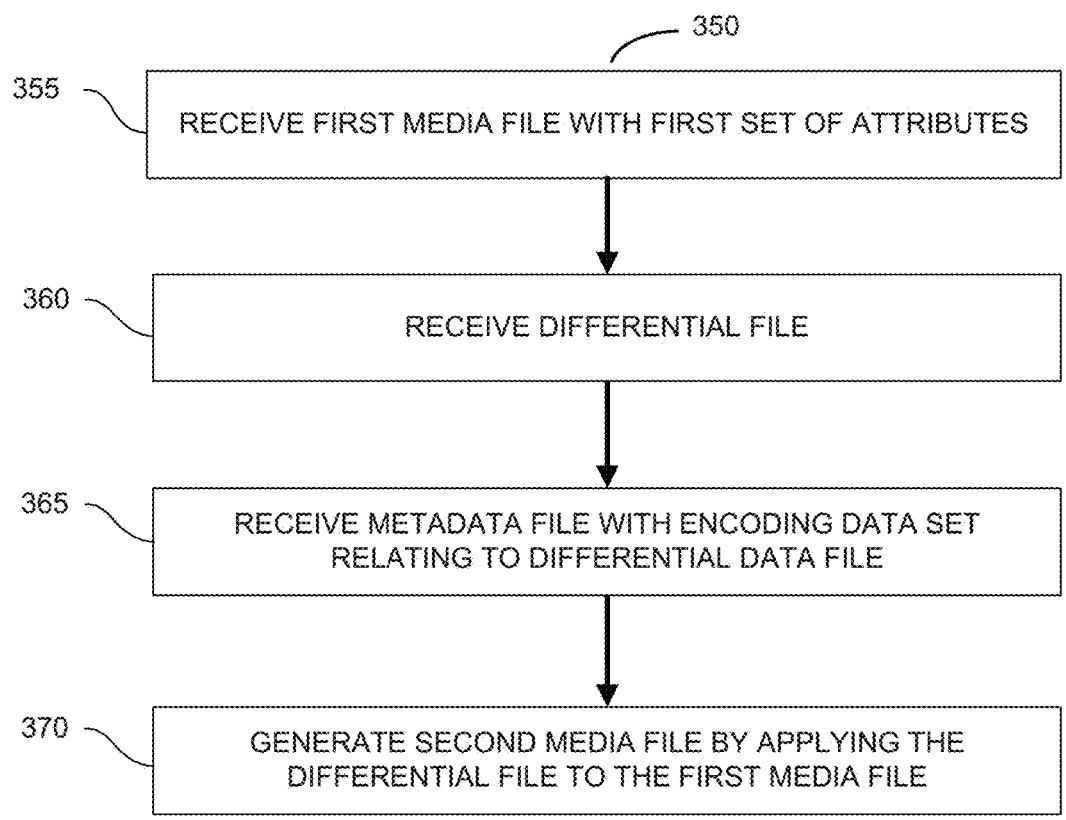
FIG. 3B illustrates an example method for decoding differential versioned digital media files, consistent with embodiments herein.

FIG. 3B illustrates an example method for decoding differential versioned digital media files. As illustrated, the example method 350 may include receiving a first digital media file with a first set of attributes at step 355, receiving a differential data file at step 360, and generating a second digital media file by applying the differential data file to the first digital media file at step 370. The method may further include receiving a metadata file at step 360 with an encoding data set relating to the differential data file with instructions for applying the differential data file to the first digital media file to generate the second digital media file. The method 350 may be implemented using a receiver as disclosed herein with respect to FIG. 2A, using an encoder/decoder module as disclosed herein with respect to FIG. 2B, or using a cloud-based differential decoder module.

The output of method 350 may be a playback ready digital media file that may be viewed by a user on a playback device, or an intermediate digital media file to which another differential data file may be applied to generate a third digital media file. It will be appreciated that method 350 may be repeated by applying multiple differential data files to a base digital media file, or one or more intermediate digital media files, with each differential data file corresponding to its own set of attributes.

One example of the disclosed technology includes providing a theatrical picture in an original version (OV). For example, the first digital media file may be an OV version of a theatrical picture. The OV version may be a high resolution file, such as a 4K EDR picture. Multiple differential data files associated with sub-versions of the theatrical picture may be generated (e.g., a 4K P3 version, a 2K EDR version, and/or a 2K P3 version). The differential data files may then be applied to the OV version base file to create digital media files for playback of each of the sub-versions.

Another example of the disclosed technology includes providing localized versions of a theatrical picture. An OV version of the theatrical picture may be used as a base digital media file, and differential data files including localized component sections may be generated. The differential data files may then be applied to the OV version base digital media file to create digital media files for playback of various localized sub-versions of the theatrical picture.

Another example of the disclosed technology may include generating home entertainment versions of a theatrical picture. An OV version of the theatrical picture may again be used as a base digital media file. Differential data files associated with various localized dubbing and subtitle elements may be generated and applied to the OV version base digital media file to create digital media files for playback of the various home entertainment versions of the theatrical picture, with desired subtitle and dubbing formats.

Another example of the disclosed technology may include providing a variety of audio formats for a theatrical picture. For example, the base digital media file may again be an OV version of a theatrical picture, inclusive of an Atmos Mix audio component. Differential data files may be generated for various audio formats, including 12.0 IMAX, 7.1 Dolby, 5.1 Dolby, 5.0 IMAX, LT/RT, or other audio formats known in the art.

Another example of the disclosed technology may include providing various versions of a theatrical picture that are compliant with Broadcast Standards & Practices (BS&P) and censorship requirements. For example, differential data files may be associated with BS&P, non-theatrical or broadcast versions of the theatrical picture, and various levels of censor compliant edits. In some examples, multiple differential data files may be generated corresponding to multiple censor compliant edit levels for a single base digital media file (e.g., a single base digital media file may be associated with a rated-R version, a rated-PG version, and a network broadcast version differential data file).

In other examples, the disclosed technology may include providing different aspect ratio versions of a digital media file. For example, a base digital media file may include an original aspect ratio (OAR) format. Differential data files may be generated for various digital media file sub-versions with varying pan or scan layers, including a 1.78 post theatrical version, or other aspect ratios as known in the art.

In some examples of the disclosed technology, a base digital media file may be used as an archival solution, wherein the base digital media file includes all available information associated with the original video content, including full resolution, audio format, color correction, and other formatting information. A series of differential data files may be generated and stored associated with versions of the base digital media file with less information (e.g., lower resolutions, lower quality sound formats, no color correction, etc.)

Figure 4A:
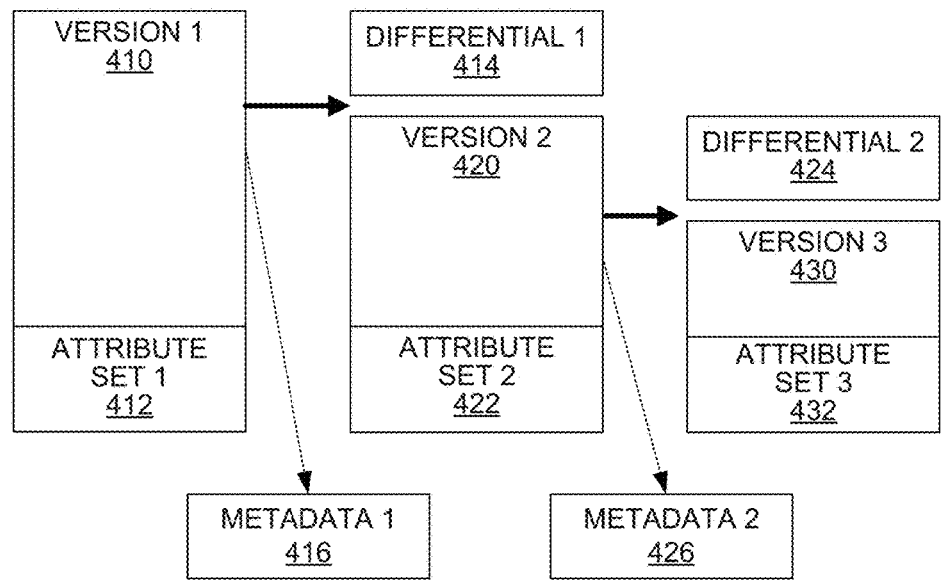
FIG. 4A illustrates an example differential versioning encoding process for digital media files, consistent with embodiments disclosed herein.

FIG. 4A illustrates an example differential versioning encoding process for digital media files. Referring to FIG. 4A, version 1 of a digital media file, 410, may include attribute set 1, 412. Applying a method for encoding differential versioned digital media files, like the one described above with respect to FIG. 3A, a differential data file 1, 414, may be generated corresponding to a version 2 of the digital media file, 420, with attribute set 2, 422. A metadata file 1, 416, corresponding to differential data file 1, 414, may also be created including an encoding information set sufficient to generate version 1 of the digital media file 410 by applying the differential data file 1, 414, to the version 2 of the digital media file, 420. As illustrated, the process may be repeated to generate a differential data file 2, 424, and metadata file 2, 426, each corresponding to a version 3 of the digital media file, 430, with attribute set 3, 432, as compared with the version 2 of the digital media file 420. Many more iterations of differential data files and metadata files may be generated corresponding to other versions of the digital media file, each with its own set of attributes.

Figure 4B:
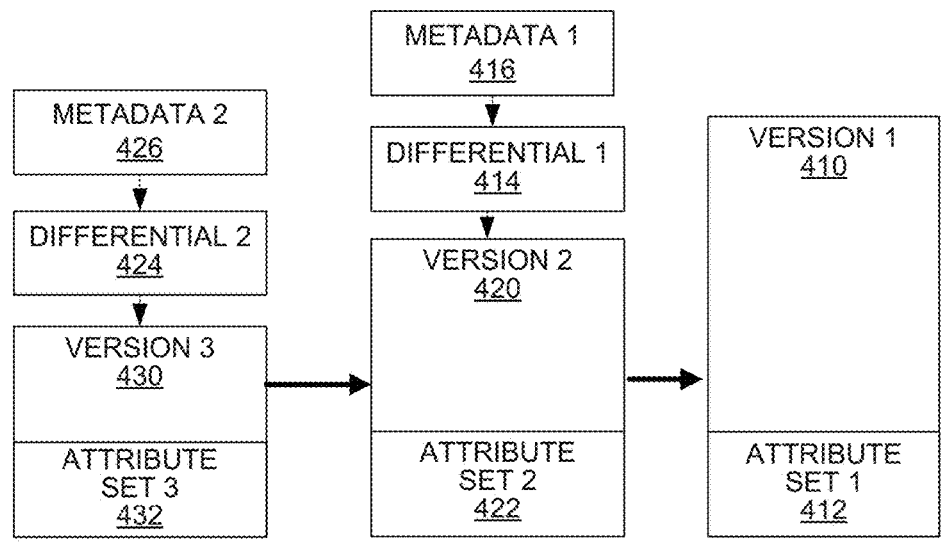
FIG. 4B illustrates an example differential versioning decoding process for digital media files, consistent with embodiments disclosed herein.

FIG. 4B illustrates an example differential versioning decoding process for digital media files. As illustrated, version 2 of the digital media file, 420, may be generated by applying the differential data file 2, 424, to version 3 of the digital media file, 430, using instructions included in metadata file 2, 426. Similarly, version 1 of the digital media file, 410, may be generated by applying the differential data file 1, 414, to version 2 of the digital media file, 420, using instructions included in metadata file 2, 412. The same methodology may be repeatedly applied to generate other versions of the digital media file using corresponding differential data files.

Figure 4C:
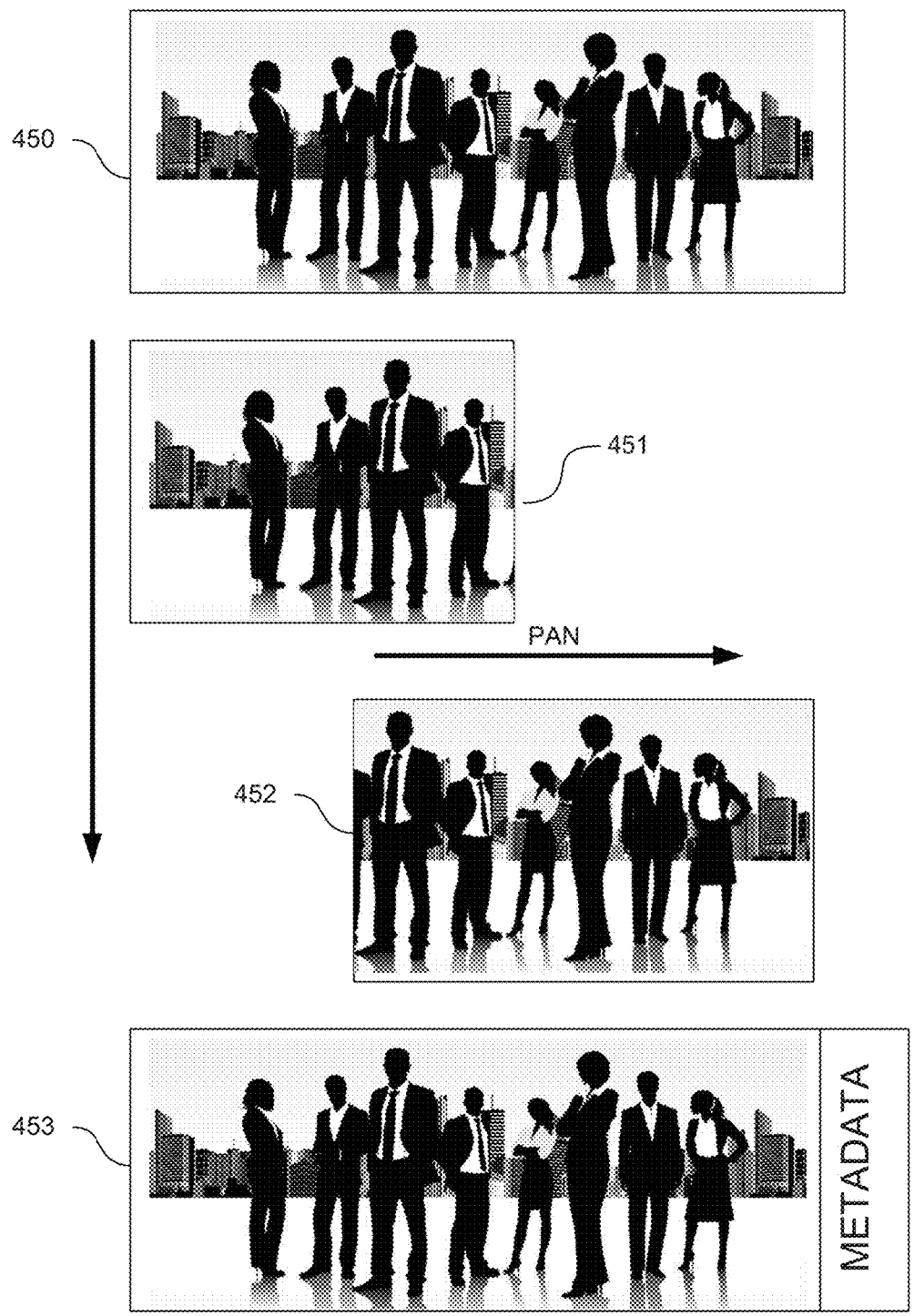
FIG. 4C illustrates an example process for providing differentially versioned content across different display formats, consistent with embodiments disclosed herein.

FIG. 4C illustrates an example process for providing differentially versioned content across different display formats. For example, the content illustrated in window 450 may be OAR content. In some embodiments, the OAR content has a 16:9 aspect ratio, or another relatively high aspect ratio such that an entire scene may be displayed in window 450. Windows 451 and 452 may be relatively lower aspect ratio formats, such as 4:3. To accommodate the lower aspect ratio, the content displayed in windows 451 and 452 may be scaled down, stretched, or configured to display only part of the OAR content at a time, but to pan and scan to different portions of the content to follow a plot line, action, or dialog within the content.

For example, as illustrated in FIG. 4C, window 451 may display a first portion of the OAR content shown in window 450. This first portion of the OAR content may include a character in the scene with active dialog at the time. As time progresses throughout the scene, the content may transition to the second portion of the OAR content shown in window 452 through a pan and scan process. The second portion of the OAR content may include a second character in the scene whose dialog follows the first character. The content may continue to pan and scan back and forth as the scene progresses in time as to follow the action. In some embodiments, the pan and scan functionality may be manually or interactively controlled by a user, such that the entire OAR content is available, but only portions are displayed according to user input. The pan and scan data may be encoded using differential versioning as disclosed herein. A full OAR content file may be stored and delivered together with differential versioning metadata used to control pan and scan positioning, as depicted in window 253.

Figure 4D:
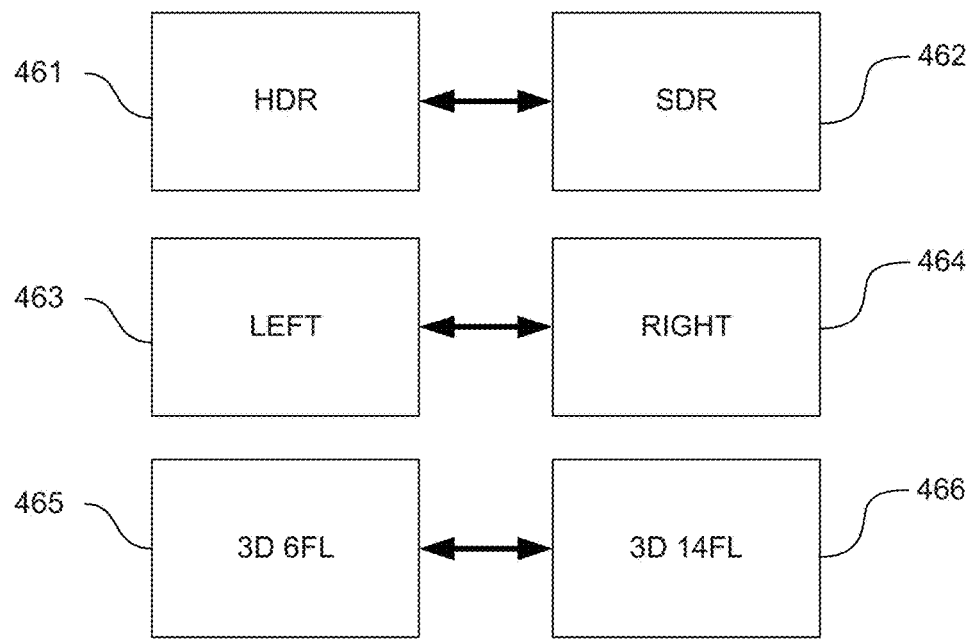
FIG. 4D illustrates example processes for providing differentially versioned content across different image formats, consistent with embodiments disclosed herein.

FIG. 4D illustrates example processes for providing differentially versioned content across different image formats. Multiple differential data files may be generated using a differential versioning process as disclosed herein. For example, multiple image resolution and pixel depth content files may be delivered using a high dynamic range (HDR) file 461 as a base content layer, and encoding an HDR differential data file with respect to a standard dynamic range (SDR) image 462.

In another example, a stereo or 3D image may be delivered by starting with a first image content file captured from a left side perspective 463 and a second image content file captured from a right side perspective 464. A stereo or 3D image differential file may be encoded by applying a differential versioning process to the first image content file 463 with respect to the second image content file 464.

In another example, image content files with varying luminescence levels and formats may be encoded. Notably, higher luminescence levels may be useful in applications involving virtual reality (VR), or 3D. As illustrated in FIG. 4D, a first image content file 465 may have include content displayed at a first luminescence level (e.g., 6 foot-lamberts). A second image content file 466 may include content displayed at a second luminescence level (e.g., 14 foot-lamberts). A brightness differential data file may be encoded by applying a differential versioning process to the first image content file 465 and the second image content file 466. The luminescence levels used in the example depicted in FIG. 4D are example level, but a person of ordinary skill in the art would appreciate that other luminescence levels may be used for each image content file.

Figure 4E:
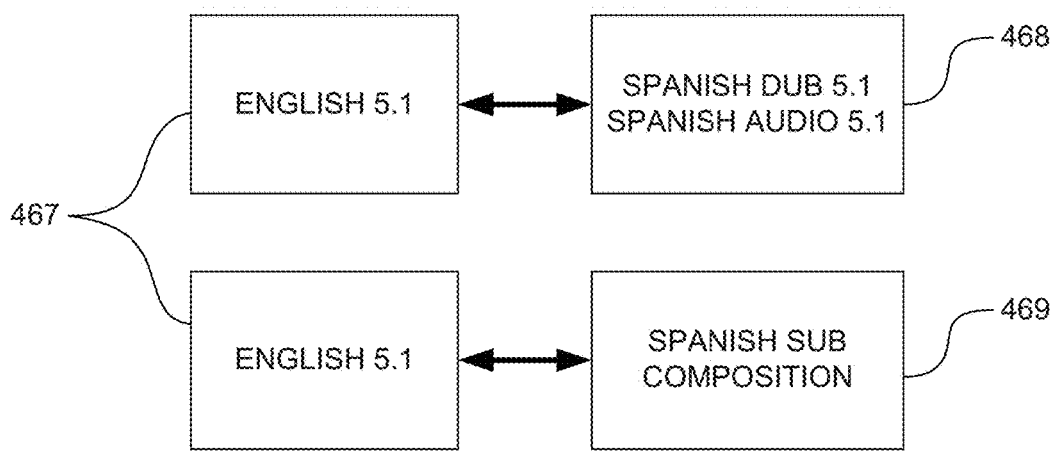
FIG. 4E illustrates example processes for providing differentially versioned content across different audio formats, consistent with embodiments disclosed herein.

FIG. 4E illustrates example processes for providing differentially versioned content across different audio formats. For example, a first content file 467 may include audio content stored in an English 5.1 format. An audio format differential version file may be encoded by applying a differential versioning process to the first audio content file 467 and a second audio content file 468 or 469. For example, the second audio content file may be a Spanish dubbed 5.1 format 468 or a Spanish sub-composition format 469. In some examples, the second audio content file may also include subtitles in either English, Spanish, or other languages, and may include different title and credit cards consistent with the desired audio format. The audio differential version file may then be applied to the first audio content file 467 to decode a desired audio content file output. The audio formats depicted in FIG. 4E are examples, but a person of ordinary skill in the art would appreciate that other audio formats may be used.

Figure 4F:
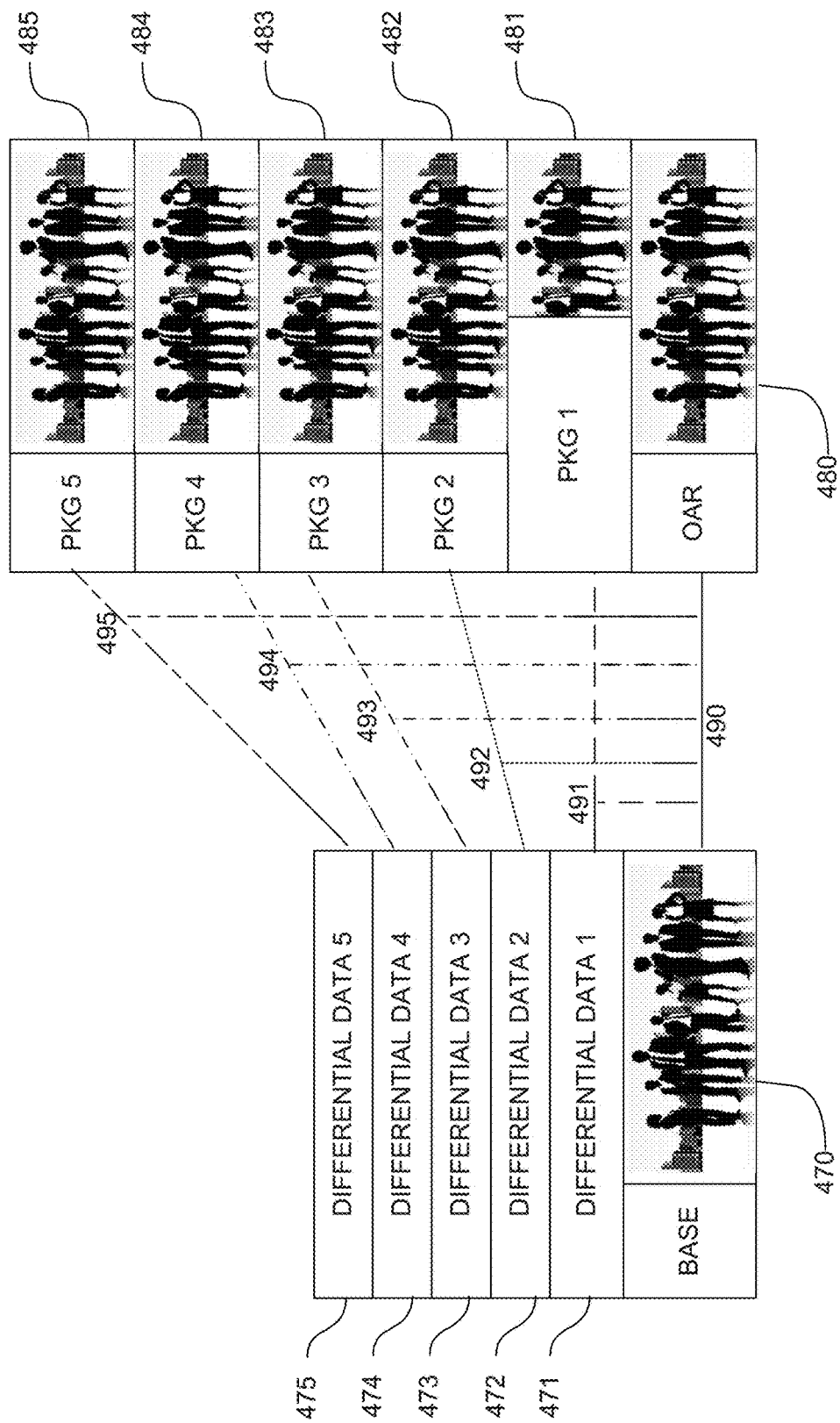
FIG. 4F illustrates an example differential versioning encoding and delivery process for digital media files, consistent with embodiments disclosed herein.

FIG. 4F illustrates an example differential versioning decoding and delivery process for digital media files. For example, a base content layer 470 may be encoded and packaged together with multiple differential data files 471-475, as well as a metadata file (not depicted) that includes instructions for applying each differential data file to decode a full content file. The resulting full content files may include an OAR file 480, and multiple content packages 481-485. For example, a decoding process 491 may apply differential data file 471 to base content file 470 to deliver content package 481. In some embodiments, differential data file 471 may be an HDR differential data file as disclosed with respect to FIG. 4D, and content package 481 may be a pan and scan content package, also as disclosed with respect to FIG. 4D.

Similarly, other decoding processes 492-495 may apply differential data files 472-475, respectively, to base content file 470 to deliver content packages 482-485, as desired by a user or as applicable to the particular content format compatibility of a particular receiver. In some embodiments, differential data files 472-475 may be stereo or 3D differential data files, brightness differential data files, audio differential data files, or other differential data files as disclosed herein. A complete multi-format compatible differential versioning package may include the base content file 470 and each differential data file 471-475, or other differential data files as applicable. Individual content format packages 480-485 may then be calculated according the differential versioning process disclosed herein.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAS, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines, components, or components of the technology are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the technology using other computing components or architectures.

Referring now to FIG. 5, computing component 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 804.

The computing component 500 might also include one or more various forms of information storage device 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 824 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard,"

"known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for electronic media distribution comprising:
a communications network for distributing electronic media;
a media repository for storing the electronic media; and
a differential versioning server comprising a processor and a non-transitory computer readable medium with computer readable instructions embedded thereon, wherein the computer readable instructions, when executed, cause the processor to:
receive a first media file comprising a first set of data with a first set of attributes, the first set of attributes selected from one or more attribute classes;
receive a second media file comprising a second set of data with a second set of attributes, the second set of attributes selected from the one or more attribute classes;
generate a first difference map based on the differences between the first media file and the second media file;
generate a first differential data file based on the first difference map; and
generate a first differential metadata file comprising an encoding data set configured to enable a media decoder to regenerate the second media file by applying the first differential data file to the first media file, and a decoding data set configured to enable the media decoder to regenerate the first media file by applying the first differential data file to the second media file.

2. The system of claim 1, wherein the first difference map comprises comparing the first media file with the second media file at a bit-by-bit granularity, a pixel-by-pixel granularity, or a frame-by-frame granularity.

3. The system of claim 1,
wherein the differential versioning server and the media repository are located on the communications network; and
the first media file and the first differential data file are stored in the media repository.

4. The system of claim 3, further comprising a user device and a local gateway configured to establish a communications channel between the user device and the communications network, wherein the user device is configured to access the first media file, the second media file, the first differential data file, or the first differential metadata file through the communications channel.

5. The system of claim 3, wherein each attribute class is selected from the group consisting of a number of bits, a bit-depth, a color format, an audio format, a localization format, and a content format.

6. The system of claim 5, wherein the second set of attributes is a subset of the first set of attributes.

7. The system of claim 5, wherein the first set of attributes is a subset of the second set of attributes.

8. The system of claim 1, wherein the computer readable instructions, when executed, further cause the processor to:
receive a third media file comprising a third set of data with a third set of attributes, the third set of attributes selected from the one or more attribute classes;
generate a second differential data file as a function of differences between the first media file and the third media file; and
generate a second differential metadata file comprising an encoding data set configured to enable a media decoder to regenerate the third media file by applying the second differential data file to the first media file.

* * * * *